Feb. 24, 1959    M. H. DEVERY    2,874,971
APPLIANCE CABINET STRUCTURE
Filed Dec. 23, 1955    3 Sheets-Sheet 1

INVENTOR.
MICHAEL H. DEVERY
BY
Carl H. Synnestvedt
AGENT

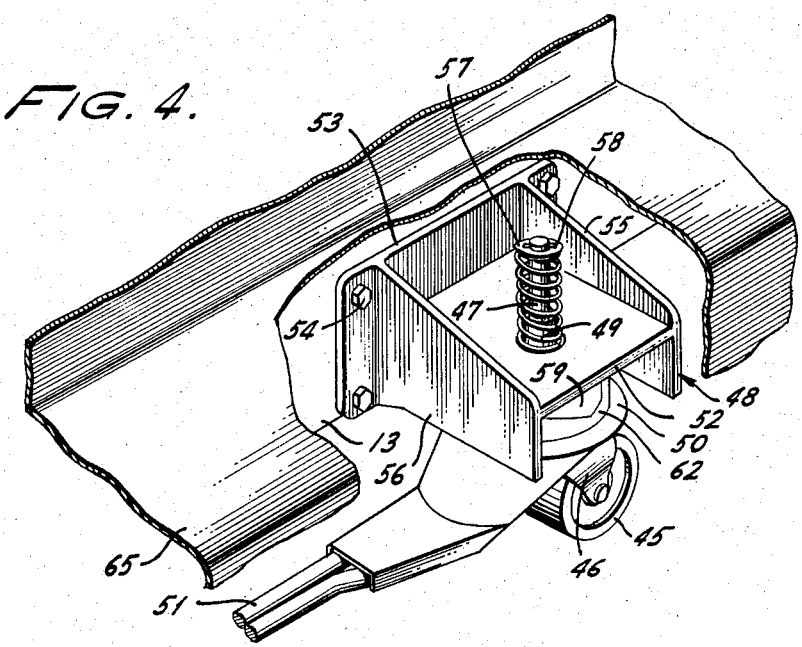
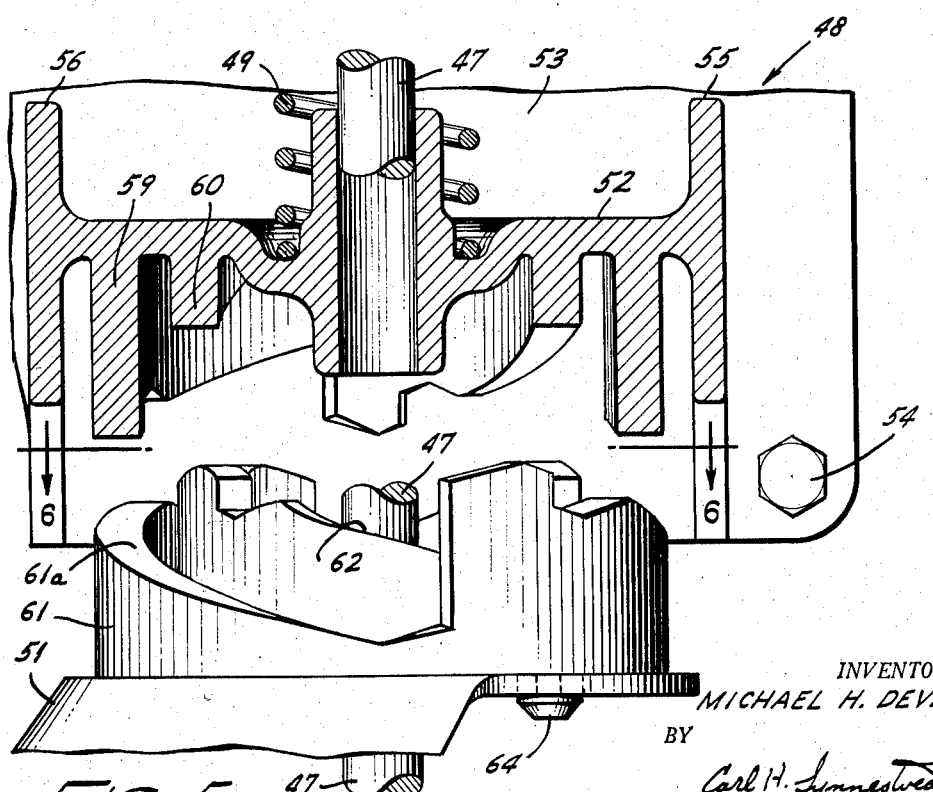

Feb. 24, 1959

M. H. DEVERY 2,874,971

APPLIANCE CABINET STRUCTURE

Filed Dec. 23, 1955

INVENTOR.
MICHAEL H. DEVERY
BY
Carl H. Synnestvedt
AGENT

United States Patent Office 2,874,971
Patented Feb. 24, 1959

2,874,971

APPLIANCE CABINET STRUCTURE

Michael H. Devery, Ambler, Pa., assignor to Philco Corporation, Philadelphia, Pa., a corporation of Pennsylvania Application December 23, 1955, Serial No. 554,948

7 Claims. (Cl. 280—46)

This invention relates to supports for appliance cabinets, particularly supports for major kitchen appliance cabinets, including refrigerators, freezers, electric ranges and the like. The invention enables such a cabinet to stand normally, without wobbling, regardless of floor irregularities and yet to be moved about, occasionally, with great ease and simplicity.

A kitchen appliance of the type mentioned constitutes a weight considerably greater than that which is readily handled by one person. Yet it is desirable that women, the main users of kitchen appliances, should be able occasionally to move the cabinet, for instance for cleaning up behind it or for changing the kitchen arrangements. On the other hand, it is equally desirable that the cabinet should stand most firmly, without any accidental shifting due to floor vibration or motor vibration and the like. Still further, when the cabinet stands at the original location thereof or at any newly assigned place, which may have new floor irregularities, it is important to provide against any insecure or wobbling support.

Some refrigerator cabinets and the like have been built with interchangeable rollers and feet; however, all of the desirable features and objects mentioned above have not been satisfied, up to now.

The several combined objects have now been achieved in a preferred embodiment by combining such a cabinet with a structure for optionally mobilizing and immobilizing it, comprising: feet mounted on the cabinet adjacent a first edge; rollers mounted adjacent a second edge of the cabinet; relatively freely accessible means for vertically adjusting and substantially permanently locking such feet and/or rollers so that the appliance normally stands level and firmly on said feet and rollers; additional, normally raised roller means mounted on the cabinet adjacent the first edge or remotely of the opposite edge; means accessible below the front and bottom edge of the cabinet for manually lowering the additional roller means relative to the cabinet and thereby raising the feet and adjacent parts of the cabinet and for then temporarily locking the additional roller means to the cabinet so that the cabinet can be moved about on the rollers and the additional roller means.

Further details and advantages of this arrangement will be understood upon a perusal of the following description of the preferred embodiment, in connection with the drawing appended hereto, wherein—

Fig. 4 is a perspective view, on a scale approximately similar to that of Fig. 3, of said additional roller means and connected automatic and manual means.

Fig. 5 is an exploded elevation, partly in axial section and on a still larger scale, of certain parts of said additional roller means.

Figure 1:
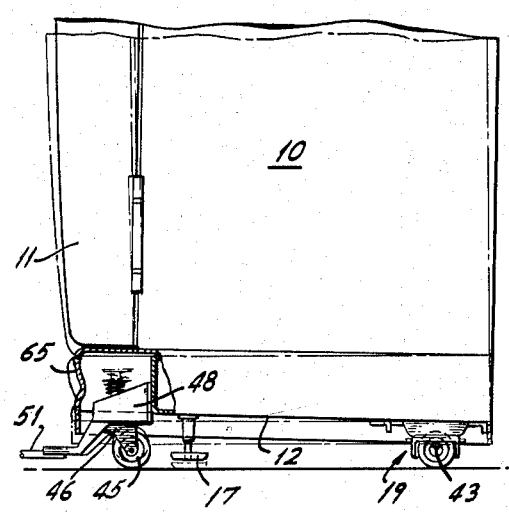
Fig. 1 is a side view of a refrigerator cabinet constructed in accordance herewith, raised and lowered positions of the cabinet being shown in this view, in full lines and broken lines, respectively.
Figure 2:
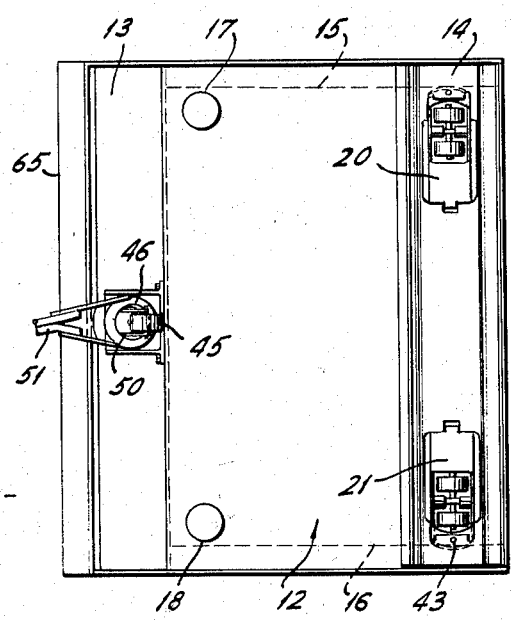
Fig. 2 is a bottom view of said refrigerator cabinet.

Referring first to Figs. 1 and 2, the refrigerator comprises the usual cabinet 10 and door 11. The cabinet and particularly the bottom 12 thereof has the usual rectangular form with rigid, more or less elongated, front and back edge members 13, 14 and side edge members 15, 16. Rigid cabinet support means are mounted on the cabinet bottom 12 adjacent the front 13. They are shown in form of a pair of supporting feet 17, 18, one adjacent each side 15, 16. The cabinet is further provided with roller support means 19 for normal engagement with the floor, said means, as shown, comprising a pair of roller units 20, 21, each adjustably secured to the bottom back element 14 of the cabinet. They extend along said element at least adjacent the sides 15, 16. The feet 17, 18 and back roller units 20, 21 constitute the normal, cabinet-immobilizing support means for the refrigerator.

Figure 3:
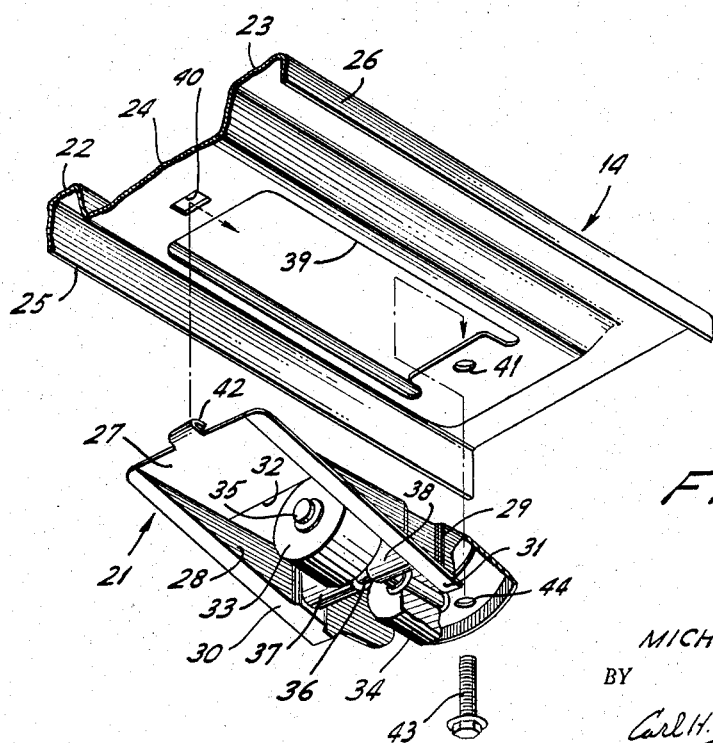
Fig. 3 is an exploded, perspective view, on a larger scale, of the part of the aforementioned roller structure and adjustment means adjacent the back of the cabinet.

Referring to Fig. 3 for adjustments and other details of the roller units 20, 21: the bottom back element 14 to which these roller units are secured may have the form of a long, upwardly facing channel, constructed of sheet metal; said channel having a pair of flanges 22 and 23, a bent web 24, between the flanges, and a stiffening rib 25, 26 at the free edge of each flange, so as to provide an air space above the web 24 for a purpose to be explained presently.

As further suggested by the figure, each roller unit comprises a frame which may have the form of a short, downwardly facing channel, constructed of sheet metal; said short channel having a flat web 27, a pair of flanges 28, 29, depending therefrom, and a stiffener and holder rib 30, 31 at the free edge of each flange. An aperture 32 is punched out of the web 27 and a pair of rollers 33, 34 are adapted to move in vertical planes in said aperture, on a common axle 35 which is parallel with the flanges 28, 29 and which in turn is secured to a transverse axle 36 parallel to the web 27. The transverse axle 36 is held or pivoted in a pair of bearing sleeves 37, 38 which are secured to the flanges 28, 29 respectively. Thus the rollers 33, 34 can rotate on their primary axle 35, when the cabinet is moved about, and can also rock on their secondary axle 36, in order to seek their proper positions, depending upon the configuration of the floor and any local depressions, inclinations or other irregularities therein.

Such positional self-adjusting of the rollers is further facilitated by providing a relatively large aperture 39 in the support strip 14 for each roller unit, so that the entire roller unit is swingable in a vertical plane across the web of the support strip and through the air space defined thereby. Each aperture 39 may approximately match and slightly exceed the size of a roller frame 20, 21. It may best be located between smaller apertures 40, 41 in said web, which serve for anchoring the frame to the web. Thus the roller frame can swing through and across the large aperture 42 in its support channel 14, as the end of the roller frame is raised or lowered by anchoring and adjusting means, to be described presently; and while such adjustment is allowed, the general elevation of the refrigerator bottom 12 can still be kept advantageously low.

Anchoring means for each roller frame are provided, at one end of the frame, by a hook member 42, punched out from an end portion of the original sheet metal blank for the frame and folded over as shown; said hook member engaging the small aperture 40 in the web 24 of the channel 14. The method of interengaging these parts when assembling them is suggested by arrows in the left part of Fig. 3. At the other end of each roller frame, a set screw 43 is provided as an additional anchoring means and for adjustment purposes. This set screw slidingly extends, from the front in Fig. 3, through the small aperture 41 in the web 24 of the channel; behind said web, the set screw extends into a threaded hole 44 in the web 27 of the roller support frame, adjacent the end of that frame opposite the hook 42. The operative position of the parts is indicated by the broken dash-dot line in the right part of the drawing. Thus one end of each roller frame 20, 21 can be adjusted vertically by a set screw 43; that is, it can be raised or lowered relative to the bottom 12, desirably by about three-eighths to one-half of an inch. The corresponding corner of the refrigerator can thus be adjusted to a corresponding extent, relative to the floor line.

The height-adjusting set screws 43 are advantageously located adjacent the cabinet sides 15, 16, whereas the other apertures 39, 40 are located inwardly and remotely from said sides. Thus the adjustment means are made as accessible as possible, although the space between the refrigerator bottom and floor may be made very low, as just explained hereinabove.

Referring now to Figs. 4 to 10, a single, additional, normally raised front roller 45 is shown, which is installed on a lower front portion of the refrigerator, between the sides 15, 16. It is held in a caster structure 46, adapted to swivel on the lower end of a vertical shaft 47; said shaft being rotatably and slidably secured to the bottom front member 13 by a support casting 48. Normally, the shaft 47 is slidingly raised, by a spring 49, so as to raise the roller 45 to a position above the floor. However, the shaft and roller can be slidingly lowered and the refrigerator front can thereby be lifted. For this purpose a cam control means 50 is provided with a horizontal manual lever handle 51 for so lifting the front and thereby mobilizing the cabinet.

More particularly, as best shown in Fig. 5, the support casting 48 comprises a horizontal shelf 52, integral with a vertical panel 53 which is secured to the front bottom member 13 by bolts 54. The casting may have a pair of stiffening ribs 55, 56. A boss on the shelf 52 has a hole formed therein, providing sliding fit with the shaft 47. The aforementioned spring 49 is shown as a compression spring, abutting downwards on the top of the shelf 52 and pushing upwards against a washer 57 secured to the upper end of the shaft 47 by a pin 58; see Figs. 8 to 10.

Figure 7:
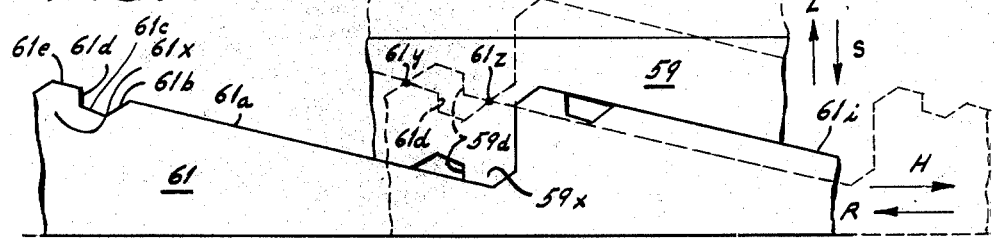
Fig. 7 is a developed, elevational front view of said detail and connected parts, on a scale between those of Figs. 4 and 5.
Figure 6:
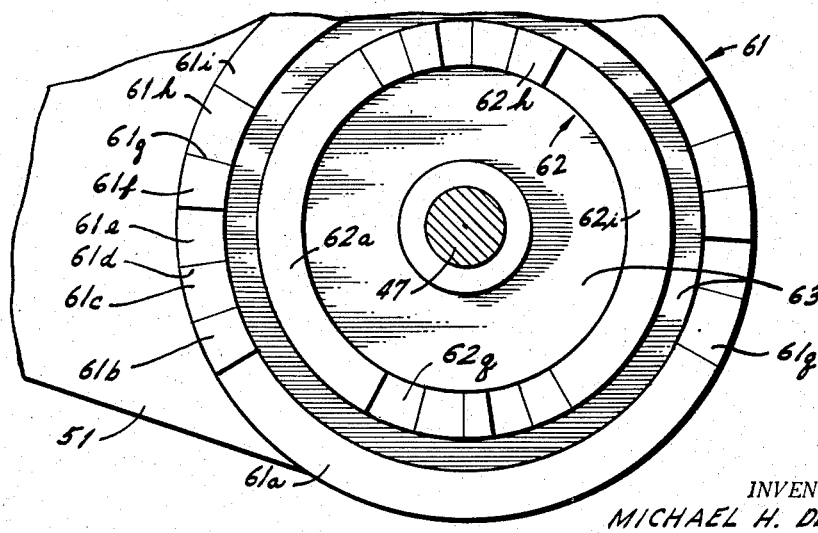
Fig. 6 is a sectional plan view of a detail taken along line 6—6 in Fig. 5.

On the underside of the shelf 52, and forming part of the cam unit 50, annular cam means are provided, which are best shown in Figs. 5 to 7. Desirably they comprise a pair of upper, non-rotatable, annular, concentric cam members 59, 60, rigidly secured to and depending from the shelf 52 and each having a pair of arcuately elongated, downwardly facing cam surfaces with mutually similar, peripheral inclinations. Below these members there are provided matching, lower, rotatable, annular, concentric cam members 61, 62, combined by web 63 and having configurations identical with those of the members 59, 60 but with corresponding cam surfaces facing upwardly. These lower cams are jointly rotatable, relative to the upper cams 59, 60 and also relative to the shaft 47 and roller caster 46, whereas suitable connector members 64 connect these lower cams with the actuating lever or handle 51. By means of a wedge action between the upper and lower cams referred to, a suitable swing of the actuating lever depresses the roller 45, relative to the shelf 52, and thereby lifts the refrigerator front, relative to the floor. The cam mechanism 50 is normally concealed behind a front shield 65; however the handle 51 is easily accessible below this shield, being normally held in a horizontal position parallel and adjacent to the front bottom edge of the refrigerator and being swingable in a wide, forward arc.

The upwardly facing cam surfaces on the rotatable cam unit 61, 62 are best shown in Figs. 6 and 7. The outer cam 61 has a long, arcuate cam surface 61a, shown as rising in a peripheral direction from right to left. Continuing to trace the cam surfaces in the same peripheral direction, there will be noted: a reverse-slant surface 61b; a short surface 61c, having a normal slant, similar to that of the long surface; a vertically rising surface 61d; another short, normal-slant surface 61e; a second reverse-slant surface 61f; a vertically dropping surface 61g; and a last reverse-slant surface 61h. The surfaces 61a to 61h, together, cover one-half of the periphery of the annular cam 61; the remaining half being covered by identically-shaped surfaces 61i to 61g. Similarly shaped and oriented surfaces 62a to 62h and 62i to 62g define the shape of the inner cam 62. Desirably the inner cam surfaces 62a, etc. are angularly displaced relative to the outer cam surfaces 61a, etc. as clearly shown in Figs. 5 and 6. Thus there are formed four similar, lower, load-distributing cams, each with a long wedge or slide surface 61a, 61i, 62a or 62i, and with a locking member, generally identified as 61x; the four locking members being defined by the above-mentioned surfaces having numbers with suffixes b to h.

The upper cams 59, 60 have similar, matching elements, comprising four major rising (downwardly facing) cam surfaces 59a, 59i, 60a, 60i and four locking members 59x.

The long wedge surfaces 61a, etc. may advantageously cover major portions of each cam, for instance about 130 degrees thereof, and the swing of the adjustment handle 51 may then cover a similar, long arc, without interference by the feet 17, 18. This arrangement is facilitated by the preferred front mounting of the cam mechanism and it, in turn, facilitates the operation of the device, as it makes the lifting and lowering of the refrigerator front very gradual and smooth.

The lifting and lowering movements are particularly shown in Fig. 7, where an arrow H indicates a movement of the lower cams, displacing rising surfaces of that cam, such as 61a, against matching surfaces of the upper cam and thereby producing a lifting movement L of the latter cam, relative to the former. At the end of the lifting movement, the pairs of upper and lower cams have only point contact, at points 61y and 61z. Thereafter, continuation of the horizontal movement H causes a slight vertical reverse movement or settling down of the upper parts relative to the lower, as indicated by arrow S, for interlocking the parts 59x, 61x. Upon a reverse horizontal movement R of the lower cam, the parts 59x, 61x are unlocked and slightly separated and there follows a complete downward movement S of the upper parts, relative to the lower ones.

Figure 8:
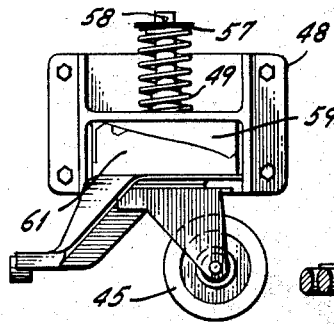
Figs. 8, 9 and 10 are actual, elevational front views of roller details from Fig. 4, in different positions, on a scale of Figs. 8 to 10 approximately equal that of Fig. 4.
Figure 9:
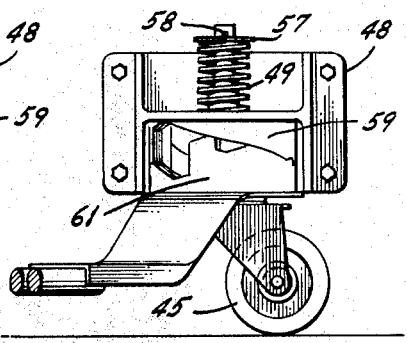

As further shown in Figs. 8 to 10, the positive actions corresponding with these relative motions are as follows: During a first phase of the cabinet-mobilizing operation, leading from the position of Fig. 8 to that of Fig. 9, the upper cam is stationary, the cabinet being supported by its feet, as shown in Fig. 1, broken-line position; during this phase the lower cam 61 moves downwardly, with the roller 45. During a second phase of this mobilizing operation, Figs. 9 to 10, the upper cam is lifted, together with the refrigerator front. At the end of this second phase, and in one sense as a third phase (not shown), there occurs the slight reverse motion or settling, locking the cabinet front in lifted position so that the entire cabinet can safely be rolled away. Thus the upper cam can be called a follower of the lower cam; a horizontal rotation of the lower cam being followed by a vertical reciprocation of the follower.

Figure 10:
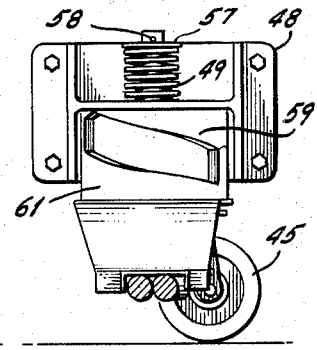

The entire lifting operation is performed by swinging the handle 51 in an arcuate motion, as far as it will go; that is, until the matching, vertical cam end surfaces, such as 61d, 59d contact one another; see Fig. 7, which shows the parts a moment before such contact is made, and Fig. 10 which shows the parts when such contact has been made. At the end of the lifting operation, the feet 17, 18 have been lifted, so far as the roller arrangement and the inclinations of the cam surfaces provide; usually, about one-quarter or three-eights of an inch. The previous lowering of the roller 45 may amount to about one-half of an inch; the slight reverse settling of the refrigerator may amount to about one-sixteenth of an inch. The lifting is achieved very smoothly by swinging the end of a reasonably long lever handle 51 through the aforementioned long arc. The swing may measure about thirty inches in length, in a typical installation. As a result, a force of not more than about ten pounds, applied to the end of the actuating handle 51, suffices for so lifting the front of a refrigerator weighing many hundred pounds.

The refrigerator can then be rolled forwardly with very little effort. If desired it can also be rolled in arcuate or lateral directions by virtue of the swivel members 46, 47.

When the refrigerator has been returned to its normal place, or relocated in a preferred location, the front can be let down again, by a horizontal reverse swing of the handle 51. At the start of such reverse swing, a slight effort is briefly required, in order to separate the reverse-slant surfaces of the locking sections 59x, 61x. Thereafter, the weight of the refrigerator and contents and, at the end of the operation, the force of the spring 49 aid in performing the reverse swing; the cam surfaces automatically slide in such direction as to lower the refrigerator onto its feet and to raise the additional roller 45 above the floor, securely immobilizing the cabinet.

While only a single embodiment of the invention has been described, it should be understood that the details thereof are not to be construed as limitative of the invention, except insofar as set forth in the following claims.

I claim:
1. In an appliance structure, a cabinet bottom having front and back portions and a pair of sides; foot support means mounted on the cabinet bottom adjacent one of said portions; a pair of roller units mounted on the cabinet bottom, one adjacent each side, near the opposite one of said portions; means for substantially permanently vertically adjusting and locking each of said roller units relative to said bottom so that the cabinet normally stands firmly on the foot support means and the two roller units; and an auxiliary support means mounted on the cabinet bottom adjacent the first named portion and comprising: additional roller means, a structure supporting the additional roller means, cam means and follower means jointly adapted to raise and lower said structure, relative to said cabinet bottom, by rotation and return of said cam means relative to said follower means, and means for temporarily locking the cam means to the follower means with the roller supporting structure and the additional roller means lowered relative to the cabinet bottom, so that the appliance structure can then roll on the pair of permanently vertically adjusted roller units and the lowered additional roller means.

2. Apparatus as described in claim 1 wherein each roller unit comprises a pair of rollers, a common axle for the same and a frame for holding the axle, the means for adjusting the roller unit comprising screw type connector means for securing the frame to the cabinet bottom.

3. Apparatus as described in claim 2 additionally comprising a second axle in each roller unit; each frame having bearing means, surrounding and holding end portions of the second axle, and the first mentioned axle being secured to the second axle, at right angles thereto.

4. A support structure for an appliance cabinet having front and back portions, a pair of sides and a bottom, said structure comprising: foot support means mounted on the cabinet bottom adjacent one of said portions; roller support means mounted on the cabinet bottom adjacent the other of said portions; means for vertically adjusting and locking a plurality of said support means relative to the cabinet so that the cabinet normally stands firmly on said several support means, and only thereon, regardless of irregularities of the floor; and an auxiliary roller device mounted on the cabinet bottom remotely of said roller support means, said auxiliary roller device comprising: a vertical shaft, roller means secured to a lower end of said shaft, spring means for automatically raising said shaft with the roller means thereon, cam and follower means jointly adapted to lower the shaft against the resistance of the spring means and to raise the foot support means and the adjacent portion of the cabinet upon horizontal rotation of the cam means relative to the follower means, and means for temporarily locking the cam means to the follower means with the shaft in lowered position.

5. Apparatus as described in claim 4 wherein the cam and follower means have a plurality of concentric, annular portions of different diameter, all of said portions having wedge-like surfaces thereon.

6. Apparatus as described in claim 5 wherein a wedge-like surface of an inner one of said portions is angularly offset relative to a wedge-like surface of an outer one of said portions.

7. Apparatus as described in claim 4 wherein said cam and follower means have surfaces inclined in one direction for guiding the follower means during the raising of the foot support means, and also have surfaces inclined in opposite directions for said locking of the cam means and for subsequently unlocking the same.

References Cited in the file of this patent

UNITED STATES PATENTS

| | | |
|---|---|---|
| 849,999 | Hendricks | Apr. 9, 1907 |
| 952,694 | Ward | Mar. 22, 1910 |
| 1,192,981 | Boehck | Aug. 1, 1916 |
| 1,194,780 | Pavey et al. | Aug. 15, 1916 |
| 1,861,919 | Hill | June 7, 1932 |
| 1,953,900 | Wolters | Apr. 3, 1934 |
| 2,311,442 | Johnston | Feb. 16, 1943 |
| 2,490,588 | Frie et al. | Dec. 6, 1949 |
| 2,682,131 | Matter | June 29, 1954 |